US009340431B2

(12) United States Patent
Isoda et al.

(10) Patent No.: US 9,340,431 B2
(45) Date of Patent: May 17, 2016

(54) INORGANIC-COMPOUND PARTICLES AND PROCESS FOR PRODUCING SAME

(71) Applicants: National Institute for Materials Science, Ibaraki (JP); Mitsuba Corporation, Gunma (JP)

(72) Inventors: Yukihiro Isoda, Tsukuba (JP); Naoki Shioda, Kiryu (JP)

(73) Assignees: NATIONAL INSTITUTE FOR MATERIALS SCIENCE, Ibaraki (JP); MITSUBA CORPORATION, Gunma (JP)

( * ) Notice: Subject to any disclaimer, the term of this patent is extended or adjusted under 35 U.S.C. 154(b) by 116 days.

(21) Appl. No.: 14/142,199

(22) Filed: Dec. 27, 2013

(65) Prior Publication Data

US 2014/0113139 A1  Apr. 24, 2014

Related U.S. Application Data

(63) Continuation of application No. 14/005,978, filed as application No. PCT/JP2012/057497 on Mar. 23, 2012, now abandoned.

(30) Foreign Application Priority Data

Mar. 25, 2011  (JP) .................................. 2011-068559

(51) Int. Cl.
   *B22F 9/04*       (2006.01)
   *B22F 9/06*       (2006.01)
   (Continued)

(52) U.S. Cl.
   CPC . *C01B 33/06* (2013.01); *B22F 9/04* (2013.01); *B22F 9/16* (2013.01); *B22F 2999/00* (2013.01); *Y10T 428/2982* (2015.01); *Y10T 428/2993* (2015.01)

(58) Field of Classification Search
   None
   See application file for complete search history.

(56) References Cited

U.S. PATENT DOCUMENTS 3,900,313 A * 8/1975 Martin .................... C22B 21/06
                                                              423/344
5,466,277 A * 11/1995 Miura .................... C22C 1/0416
                                                              148/698

FOREIGN PATENT DOCUMENTS

CN    101850977 A    10/2010
JP    08120301         5/1996
(Continued)

OTHER PUBLICATIONS

JP 2011-040506, machine translation from J-PlatPat (published Feb. 24, 2011).*

(Continued)

*Primary Examiner* — George Wyszomierski
(74) *Attorney, Agent, or Firm* — Hoffmann & Baron, LLP

(57) ABSTRACT

A method of producing inorganic compound particles is provided. It includes a step of impregnating a melt liquid of second raw particles into first raw particles by heating a raw material including them at a temperature, which equals to or higher than an eutectic temperature between a region-II (solid-liquid phase range) and a region-I (solid phase range) in a phase diagram and lower than the melting temperature of the inorganic compound. The first raw particles contain an element with a melting point equals to or higher than a melting point of the inorganic compound. The second raw particles contain an element with a melting point lower than the inciting point of the inorganic compound. The method also includes a step of synthesizing inorganic compound particles by a synthetic reaction in the first raw particles between the elements contained in the first and second raw particles.

6 Claims, 11 Drawing Sheets

(51) Int. Cl.
    *C01B 33/06*     (2006.01)
    *C22C 29/18*     (2006.01)
    *B22F 9/16*     (2006.01)

(56) References Cited

FOREIGN PATENT DOCUMENTS

| | | | |
|---|---|---|---|
| JP | 2002-285274 | A | 10/2002 |
| JP | 2002368291 | A | 12/2002 |
| JP | 2009094497 | A | 4/2009 |
| JP | 2011040506 | A | 2/2011 |
| WO | WO2004016375 | A1 | 2/2004 |

OTHER PUBLICATIONS

Supplemenary Partial European Search Report for Corresponding European Application No. EP12762958, pp. 1-12 (Feb. 17, 2015).
Office Action for corresponding Japanese Application No. 2011-068559, pp. 1-6 (Nov. 4, 2014).
Nishida I, et al., Thermoelectrics-Principles and Applications, Realize Science & Engineering Center, p. 1 (Mar. 30, 2001).
Yukihiro Isoda et al., "Fabrication and Thermoelectric Properties on Silicides Thermoelectric Materials with Eco-Friendly", Ceramics, vol. 40, No. 7, pp. 534-537 (2005).
International Search Report for corresponding PCT application PCT/JP2012/057497, pp. 1-5 (Jul. 3, 2012).

* cited by examiner

INORGANIC-COMPOUND PARTICLES AND PROCESS FOR PRODUCING SAME

CROSS-REFERENCE TO RELATED APPLICATIONS

This application is a continuation of U.S. application Ser. No. 14/005,978, filed on Sep. 18, 2013, which is a National Phase application of International Application No. PCT/JP2012/057497 filed Mar. 23, 2012, which claims priority based on Japanese Application No. 2011-068559 filed Mar. 25, 2011, all of which are incorporated herein by reference.

TECHNICAL FIELD

The present invention relates to a method for producing inorganic compound particles such as an Mg—Si-based compound, Mg—Ge-based compound, or the like. Also, the present invention relates to inorganic compound particles produced by the above-mentioned method.

BACKGROUND ART

Conventionally, the production method of inorganic compound particles which is the compound including multiple element, generally utilizes the following processes; An obtained ingot by directly melting multiple raw materials, is crushed by using stamp mill and ball-mill (see NPL 1).

Other than the method described above, the atomizing method (the water atomization method, the gas atomization method, etc), the centrifugal atomization method, the mechanical alloying method, or the like is known as a method of producing inorganic compound particles.

The atomizing method is a method in which particles of a compound can be obtained forming particles by spraying the melt liquid of raw materials. In the centrifugal atomization method, the particles of compound can be obtained by the centrifugal force which drops melt liquid of the raw materials into the rotating plate. In the mechanical alloying method, particles of a compound can be obtained by alloying the raw material particles using a ball mill.

RELATED ART DOCUMENT

Patent Literature

Non-Patent Literature

[NPL 1] Nishida I, et al., Thermoelectric conversion engineering, Fundamentals and Applications, Realize Science & Engineering Center, Mar. 30, 2001

DISCLOSURE OF INVENTION

Problems to be Solved by the Invention

For example, in a case of $Mg_2Si$ or $Mg_2Ge$, the boiling point of Mg (1090° C.) is close to the melting points of $Mg_2Si$ (1085° C.) or $Mg_2Ge$ (1117° C.).

Thus, variation of the composition of the inorganic compound by the vaporization of Mg, contamination of impurities, oxidization, or the like in the conventional methods (atomizing method, centrifugal splaying method, or the like) can happen when $Mg_2Si$ (or $Mg_2Ge$) is synthesized by melting and mixing Mg and Si (or Ge).

Furthermore, when the particle size of the raw particles materials is large, producing particles of an inorganic compound with homogenous is difficult for the mechanical alloying method. On the other hand, countermeasures against dust explosion have to be taken in a case where the particle size of the raw particles is small.

Because of the reasons described above, to obtain inorganic compound (for example, $Mg_2Si$ and $Mg_2Ge$) particles with a particularly large particle size (for example, several 10 microns or more) the raw materials are synthesized only by directly melting in a pressurized airtight container to avoid the vaporization of Mg and then the obtained ingot is crushed, that is believed as a common knowledge in the present technical field.

However, the production process, which produces ingots and crushed it, is cumbersome and increases the production cost.

The present invention is made under the circumstances described above. The purpose of the present invention is to provide inorganic compound particles and a method to produce thereof, in which inorganic compound particles with an intended composition and a particle size can be easily obtained.

Means for Solving the Problems

The present invention is a production method of the inorganic compound particles which are the compounds containing multiple elements which has the mutually different melting points. The method includes the following steps. A raw material includes the first raw material particles containing the element which has the higher melting point more than the melting point of the above-mentioned inorganic compound in the above-mentioned multiple elements, and the second raw material particles containing the element which has the lower melting point of less than the melting point of the above-mentioned inorganic compound in the above-mentioned multiple elements. When the raw materials is heated at the lower than the melting point of the inorganic compound and above the eutectic crystal temperature between the region-II (liquid-solid phase range) and the region-I (solid phase range) on the phase diagram of the above-mentioned element which constitutes both the above-mentioned raw material particles, the liquid of the second raw material particles infiltrated into the above-mentioned first raw material particles. And the particles of the inorganic compound were synthesized by a synthetic reaction in the first raw particles between the element contained in the first raw particles and the element contained in the second raw particles.

In the producing method of an inorganic compound particles, which is the first aspect of the present invention, the first raw particles and the second raw particles may be mixed in the raw material in an atomic ratio corresponding to major element ratios of the element contained in the first raw particles and the element contained in the second raw particles within the particles of the inorganic compound.

In the producing method of inorganic compound particles, which is the first aspect of the present invention, particle sizes of the first raw particles may be more than 20 μm and equal to or less than 500 μm, and particle sizes of the particles of the inorganic compound may be more than 25 μm and equals to or less than 1 mm after the synthesized.

In the producing method of inorganic compound particles, which is the first aspect of the present invention, the first raw particles may be a mixture of plural types for the made particles by the different elements.

In the producing method of inorganic compound particles, which is the first aspect of the present invention, the first raw particles may be a composite of plural types for the made particles by the different elements.

A second aspect of the present invention is a particle of an inorganic compound obtained by the first aspect of the present invention, and an outer surface of the inorganic compound particle is covered by protuberances, which are minute relative to a particle size of the inorganic compound particle, in a raised fabric shape.

In the particle of an inorganic compound, which is the second aspect of the present invention, the particle may have a bi-layer structure with a central part and an outer peripheral part, those is, the central part which is a major constituent element by the element contained of the first raw particles, and the outer peripheral part which is a major constituent element by the element contained of the first raw particles and the second raw particles.

In the particle of an inorganic compound, which is the second aspect of the present invention, the particle of the inorganic compound may have a uniform composition from an outer peripheral part to a central part of the particle of the inorganic compound.

Effects of the Invention

The first aspect of the present invention is an unconventional and novel chemical synthesis method based on a finding that particles of an inorganic compound can be obtained by a synthetic reaction in a particle after absorption by the melt liquid of one element into the particle containing the other element.

In this method, production cost can be easily reduced. There is no need for the crashing process at all in the method, since the core raw particles (which are the first raw particles) can be turned into particles of the inorganic compound, even if the particle sizes of the inorganic compound particles are several dozens of microns or more.

In addition, variation of the composition for the particles, contamination of impurities, oxidation, or the like can be suppressed in the first aspect of the present invention, since the first raw particles are not melted.

In addition, the particles of an inorganic compound, which is the second aspect of the present invention, can have a multi-layered structure in which only the outer peripheral part of the particle (outer surface part) is made by the synthesized material. Alternatively, the entire part of the particle can have a uniform composition. The structure for the particles of the inorganic compound can be easily regulated by the size of the second raw particles, the heating temperature, the heating time, or the like.

The size of the particle of the inorganic compound can be determined by the amount of the material (the second raw particles) adsorbed into the first raw particles. Thus, if a particle diameter needed is set in advance, compound particles with an intended size can be obtained at a high yield by determining the size of the first raw particles and taking into account the synthesis condition.

Further, the specific surface area of the obtained compound particles is significantly increased since the surface of the compound particles are covered by nano-size protuberances of a raised fabric shape. Thus, particles having an excellent surface effect can be provided. In addition, each particle can be conjugated easily by the protuberances in a raised fabric shape, increasing the mechanical strength of the sintered compact.

BEST MODE FOR CARRYING OUT THE INVENTION

Figure 1:
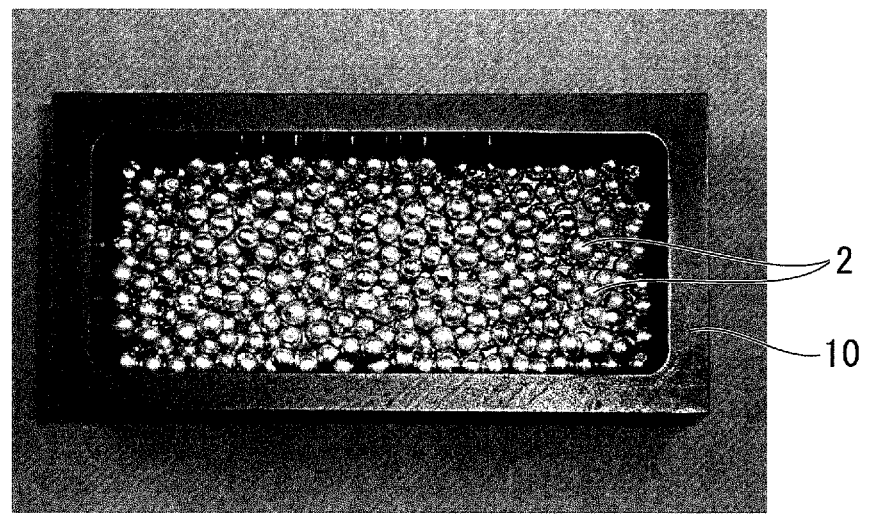
FIG. 1 is a photograph showing an example which is process to produce an inorganic compound particles by the production method of the present invention. The photograph shows a heating container which uses in the production method and placed Mg granules into the container.

The method of producing particles of an inorganic compound is a method of producing particles of an inorganic compound that is a composite including a plurality of elements with different melting points.

In the method of the present invention, a raw material, which includes first raw particles containing an element with a melting point equals to or higher than a melting point of the inorganic compound including the plurality of elements (hereinafter, referred as "H point") and second raw particles containing an element with a melting point lower than the H point, is prepared.

As the inorganic compound, compounds made of magnesium (Mg, melting point: 650° C.) and an element with a different melting point from that of Mg can be named.

As the element with a different melting point from that of Mg, silicon (Si) (melting point: 1412° C.) and germanium (Ge) (melting point: 937° C.) can be used. It is preferable that the using element has a higher melting point than Mg.

As examples of the inorganic compound, Mg—Si-based compound, Mg—Ge-based compound, and the like are named. The inorganic compound can be constituted from 3 or more of elements.

As examples of Mg—Si-based compound, $Mg_2Si$, $Mg_{(2-x)}SiB_x(0<x\leq0.2)$, $Mg_2Si_{(1-x)}P_x(0<x\leq0.2)$, $Mg_{(2-x)}Si_1Al_x(0<x\leq0.2)$, $Mg_2Si_{(1-x)}Sb_x(0<x\leq0.2)$, $Mg_2Si_{(1-x)}Bi_x(0<x\leq0.2)$, and the like are named.

As examples of Mg—Ge-based compound, $Mg_2Ge$, $Mg_{(2-x)}GeB_x(0<x\leq0.2)$, $Mg_2Ge_{(1-x)}P_x(0<x\leq0.2)$, $Mg_{(2-x)}Ge_1Al_x(0<x\leq0.2)$, $Mg_2Ge_{(1-x)}Sb_x(0<x\leq0.2)$, $Mg_2Ge_{(1-x)}Bi_x(0<x\leq0.2)$, and the like are named.

It is preferable that the inorganic compound is an intermetallic compound.

The first raw particles and the second raw particles are particles containing the constituting elements of the inorganic compound.

The first raw particles includes an element with a melting point equals to or higher than the H point (hereinafter referred as high melting point element) among the constituent elements as a major composition element. A preferable high melting point element is any one of Si and Ge, at least. Being the major element means that the content ratio of the element is the highest within the first raw particles.

One or more selected from the group consisting B, P, Al, Sb, and Bi may be added to the first raw particles.

It is preferable that the particle size of the first raw particles exceeds 20 μm. Also, it is preferable that the size of the first raw particles is 1 mm or less. More preferably, it is 700 μm or less. Even more preferably, it is 500 μm or less.

If the particle size of the first raw particles is too small, they tend to be in irregularly-shaped block form (see the testing number 4-19 in Table 4). If the particle size of the first raw particles is excessively large, the composition of the inorganic compound particles tends to be uneven (see the testing number 4-20 in Table 4).

The second raw particles include an element with a melting point lower than the H point (hereinafter referred as low melting point element) among the constituent elements as a major composition element. As the low melting point element, Mg is preferable.

Examples of combinations of the first and second raw particles are shown in TABLE. 1

TABLE 1

| No. | Raw material | | Heating temperature (° C.) | | Composition of inorganic compound particle |
| --- | --- | --- | --- | --- | --- |
| | First raw material | Second raw material | Lower limit temperature (° C. or higher) | Upper limit temperature (lower than ° C.) | |
| 1-01 | Ge | Mg | 636 | 696 | $Mg_2Ge$ |
| 1-02 | Si | Mg | 650 | 945 | $Mg_2Si$ |

The first raw particles may be constituted from a single element. Alternatively, they may be a mixture of different types of particles with different elements each other.

TABLES 2 and 3 show examples of the first raw particles and particles of an inorganic compound made of a mixture including several kinds of particles.

For example, if Si particles (major element) and B particles (dopant element) are used as the first raw particles and Mg particles are used as the second raw particles, the particles of the inorganic compound made of $Mg_{(2-x)}SiB_x(0<x\leq0.2)$ can be obtained (see the testing number 2-01 in TABLE 2).

If Si particles (major constituent element), B particles (dopant element), and Al particles (dopant element) are used as the first raw particles and Mg particles are used as the second raw particles, the particles of the inorganic compound made of $Mg_{(2-x-y)}SiB_xAl_y$ $(0<x+y\leq0.2)$ can be obtained (see the testing number 3-01 in TABLE 3).

Also, 3 or more kinds of dopant elements may be used.

TABLE 2

| | Raw material | | | Heating temperature (° C.) | | |
| --- | --- | --- | --- | --- | --- | --- |
| | First raw particle I | First raw particle II | | | | |
| No. | Main element | Minor element | Second raw particle | Lower limit temperature (° C. or higher) | Upper limit temperature (lower than ° C.) | Composition of inorganic compound particle |
| 2-01 | Si | B | Mg | 650 | 945.6 | $Mg_{(2-x)}SiB_x(0 < x \leq 0.2)$ |
| 2-02 | Si | P | Mg | 650 | 945.6 | $Mg_2Si_{(1-x)}P_x(0 < x \leq 0.2)$ |
| 2-03 | Si | Al | Mg | 650 | 945.6 | $Mg_{(2-x)}Si_1Al_x(0 < x \leq 0.2)$ |
| 2-04 | Si | Sb | Mg | 650 | 945.6 | $Mg_2Si_{(1-x)}Sb_x(0 < x \leq 0.2)$ |
| 2-05 | Si | Bi | Mg | 650 | 945.6 | $Mg_2Si_{(1-x)}Bi_x(0 < x \leq 0.2)$ |

TABLE 2-continued

| | Raw material | | | Heating temperature (° C.) | | |
|---|---|---|---|---|---|---|
| | First raw particle I | First raw particle II | | | | |
| No. | Main element | Minor element | Second raw particle | Lower limit temperature (° C. or higher) | Upper limit temperature (lower than ° C.) | Composition of inorganic compound particle |
| 2-06 | Ge | B | Mg | 635.6 | 696.7 | $Mg_{(2-x)}GeB_x(0 < x \leq 0.2)$ |
| 2-07 | Ge | P | Mg | 635.6 | 696.7 | $Mg_2Ge_{(1-x)}P_x(0 < x \leq 0.2)$ |
| 2-08 | Ge | Al | Mg | 635.6 | 696.7 | $Mg_{(2-x)}Ge_1Al_x(0 < x \leq 0.2)$ |
| 2-09 | Ge | Sb | Mg | 635.6 | 696.7 | $Mg_2Ge_{(1-x)}Sb_x(0 < x \leq 0.2)$ |
| 2-10 | Ge | Bi | Mg | 635.6 | 696.7 | $Mg_2Ge_{(1-x)}Bi_x(0 < x \leq 0.2)$ |

TABLE 3

| | Raw material | | | | Heating temperature (° C.) | | |
|---|---|---|---|---|---|---|---|
| | First raw particle I | First raw particle II | First raw particle III | Second raw particle | Lower limit temperature | Upper limit temperature | Composition of inorganic compound particle |
| No. | Main element | Minor element | Minor element | | (° C. or higher) | (lower than ° C.) | |
| 3-01 | Si | B | Al | Mg | 650 | 945.6 | $Mg_{(2-x-y)}SiB_xAl_y(0 < x + y \leq 0.2)$ |
| 3-02 | Si | P | Al | Mg | 650 | 945.6 | $Mg_{(2-y)}Si_{(1-x)}P_xAl_y(0 < x + y \leq 0.2)$ |
| 3-03 | Si | Sb | Al | Mg | 650 | 945.6 | $Mg_{(2-y)}Si_{(1-x)}Sb_xAl_y(0 < x + y \leq 0.2)$ |
| 3-04 | Si | Bi | Al | Mg | 650 | 945.6 | $Mg_{(2-y)}Si_{(1-x)}Bi_xAl_y(0 < x + y \leq 0.2)$ |
| 3-05 | Ge | B | Al | Mg | 635.6 | 696.7 | $Mg_{(2-x-y)}GeB_xAl_y(0 < x + y \leq 0.2)$ |
| 3-06 | Ge | P | Al | Mg | 635.6 | 696.7 | $Mg_{(2-y)}Ge_{(1-x)}P_xAl_y(0 < x + y \leq 0.2)$ |
| 3-07 | Ge | Sb | Al | Mg | 635.6 | 696.7 | $Mg_{(2-y)}Ge_{(1-x)}Sb_xAl_y(0 < x + y \leq 0.2)$ |
| 3-08 | Ge | Bi | Al | Mg | 635.6 | 696.7 | $Mg_{(2-y)}Ge_{(1-x)}Bi_xAl_y(0 < x + y \leq 0.2)$ |

Also, the first raw particles may be a composite of multiple kinds of particles having different element each other.

For example, if a composite of Si (major constituent element) and B is used as the first raw particles and Mg particles are used as the second raw particles, the particles of the inorganic compound made of $Mg_{(2-x)}SiB_x(0<x\leq0.2)$ can be obtained.

If a composite of Si (major constituent element), B, and Al is used as the first raw particles and Mg particles are used as the second raw particles, the particles of the inorganic compound made of $Mg_{(2-x-y)}SiB_xAl_y$ (0<x+y≤0.2) can be obtained (see the testing number 3-01 in TABLE 3).

Also, 3 or more kinds of dopant elements may be used.

As explained above, a case where a mixture or compound for multiple kinds of particles is used, particles of an inorganic compound containing the dopant elements can be obtained as the final product due to a synthetic reaction of 2 or more elements. Therefore, the obtained final product can be utilized directly.

The ratio between the used first and second raw particles can be set based on the atomic ratio corresponding to the ratio of the major constituent elements included in both particles in the intended particles of the inorganic compound.

For example, in the case where $Mg_2Si$ of the intended the inorganic compound particles is the ratio between the used first and second raw particles can be set based on the ratio corresponding to the atomic ratio of the major constituent elements of the first and second raw particles (Mg and Si) on the final product $Mg_2Si$.

Even in a case where the intended inorganic compound particles is a substance with 3 or more elements such as $Mg_{(2-x)}SiB_x(0<x\leq0.2)$, which is the ratio between the used first and second raw particles can be set based on the ratio corresponding to the atomic ratio (Mg:Si=2-x:1) of the major constituent elements of the first and second raw particles (Mg and Si) on the final product $Mg_{(2-x)}SiB_x$.

Even in a case where the intended inorganic compound particles is a substance with 4 or more elements such as $Mg_{(2-x-y)}SiB_xAl_y$ (0<x+y≤0.2), which is the ratio between the used first and second raw particles can be set based on the ratio corresponding to the atomic ratio (Mg:Si=2-x-y:1) of the major constituent elements of the first and second raw particles (Mg and Si) on the final product $Mg(2-x-y)SiB_xAl_y$.

It is preferable that the ratio between the used first and second raw particles is appropriately adjusted and set based on conditions, such as the composition of the intended inorganic compound, and whether the structure in the inorganic compound is a homogeneous single layer or multi-layered.

If the second raw particles are excess at the usage ratio between the first and second raw particles, the melt liquid of the second raw particles cannot be absorbed to the first raw particles completely, it permitted that the un-absorbed melt liquid resides. Such residual second raw particles act as binders, and possibly cause formation of the particles in a block form. On the other hand, if the second raw particles are supplied insufficiently, the synthetic reaction within the first raw particles proceeds insufficiently. Therefore, the intended composition and a layered structure cannot be obtained.

Contrary to that, if the usage ratio of the both raw particles is within the range of plus and minus 2% relative to the usage ratio (for example, the atomic ratio) of each raw particle determined from the composition or the structure of the intended inorganic compound, the intended inorganic compound not in a block form (aggregated form) can be obtained.

Next, the raw material including the first and second raw particles is heated.

Figure 2:
FIG. 2 is a photograph showing a process continued from FIG. 1. The photograph shows a state where Si particles were placed on the Mg granules.

As shown in FIGS. 1 and 2, a heating container 10 (carbon board) made of carbon or the like can be used for heating the raw material.

For example, the second raw particles 2 made of Mg or the like are placed on all over the bottom surface of the heating container 10 evenly (see FIG. 1). Then, the first raw particles 1 made of Si or the like are placed on the second raw particles 2 (see FIG. 2). It is preferable that the first raw particles 1 are place on the second raw particles 2 to cover the second raw particles 2. Then, the heating container 10 is placed in the heating furnace to heat the raw material.

It is preferable that the heat treatment is performed in a non-oxidative atmosphere in order to avoid oxidization of the raw material. For example, it is preferable that the heat treatment is performed under an inert gas atmosphere such as argon (Ar) or the like, or a mixed gas atmosphere in which hydrogen ($H_2$) is mixed with an inert gas.

The heat treatment temperature is higher than the eutectic temperature between the region-II (liquid-solid phase range) and the region-I (solid phase range) in a phase diagram of the elements constituting the both raw particles, and lower than the H point.

Figure 18:
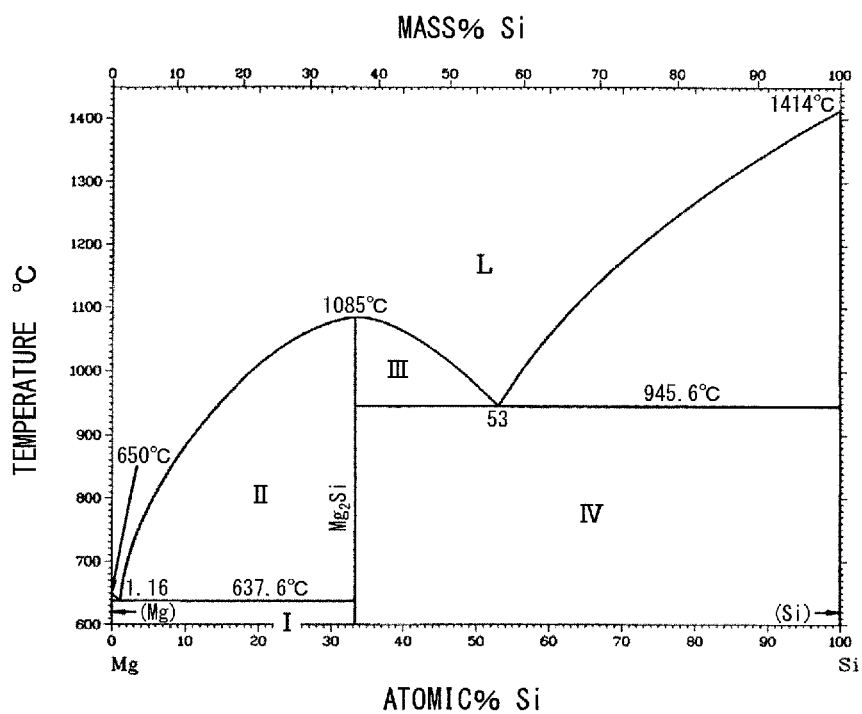
FIG. 18 is a phase equilibrium diagram of Mg—Si.

FIG. 18 is a binary system equilibrium diagram of Mg—Si which constitutes $Mg_2Si$ as an example of the inorganic compound. In this phase diagram, the region-I corresponds to Mg (solid phase) and $Mg_2Si$ (solid phase), the region-II corresponds to a liquid phase and $Mg_2Si$ (solid phase), the region-III corresponds to a liquid phase and Si (solid phase), and the region-IV corresponds to Si (solid phase) and $Mg_2Si$ (solid phase).

Therefore, in order to produce the particles of the inorganic compound made of $Mg_2Si$ from the first raw particles 1 (Si) and the second raw particles 2 (Mg), the heat treatment temperature is set to 650° C., which is the eutectic temperature of the regions I and II, or higher and lower than 945.6° C., which is the H point.

The second raw particles 2 (Mg) is melted by heated at the above-mentioned temperature range. On the other hand, the first raw particles 1 (Si) are maintained at the solid-phase state. The melt liquid of the second raw particles 2 (Mg) is adsorbed into the first raw particles 1 (Si). The particles of the inorganic compound ($Mg_2Si$) can be obtained by synthetic reaction between Mg and Si within the first raw particles 1.

The preferable heat treatment temperature depends on the particle diameters of the first particles 1 and second raw particles 2. When the size of the first particles 1 and second raw particles 2 are larger, it is preferable to set a higher heat treatment temperature. If the heat treatment temperature is high, the composition in the particles of the inorganic compound is tendency which becomes more homogeneous.

For example, the heating time is 1 to 10 hours. It is preferable to set a longer heating time when the particle size of the first raw particles 1 and the second raw particles 2 are larger. The composition in the particles of the inorganic compound is tendency which becomes more homogeneous if the heating time is long.

Examples of heat treatment temperature are shown in TABLES 1 to 3.

Figure 7:
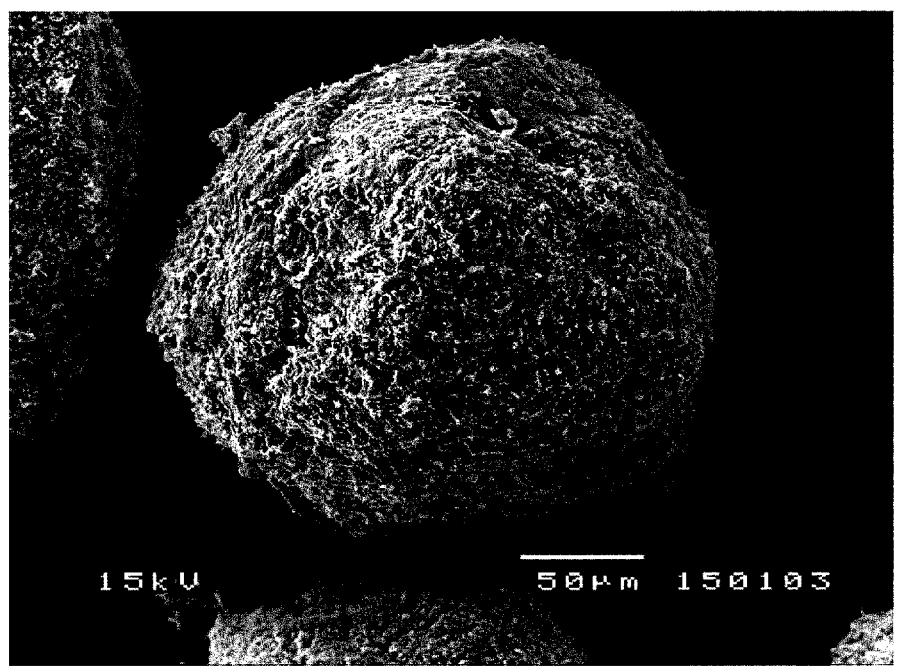
FIG. 7 is a scanning electron micrograph of the inorganic compound particles for the test number 4-05.
Figure 8:
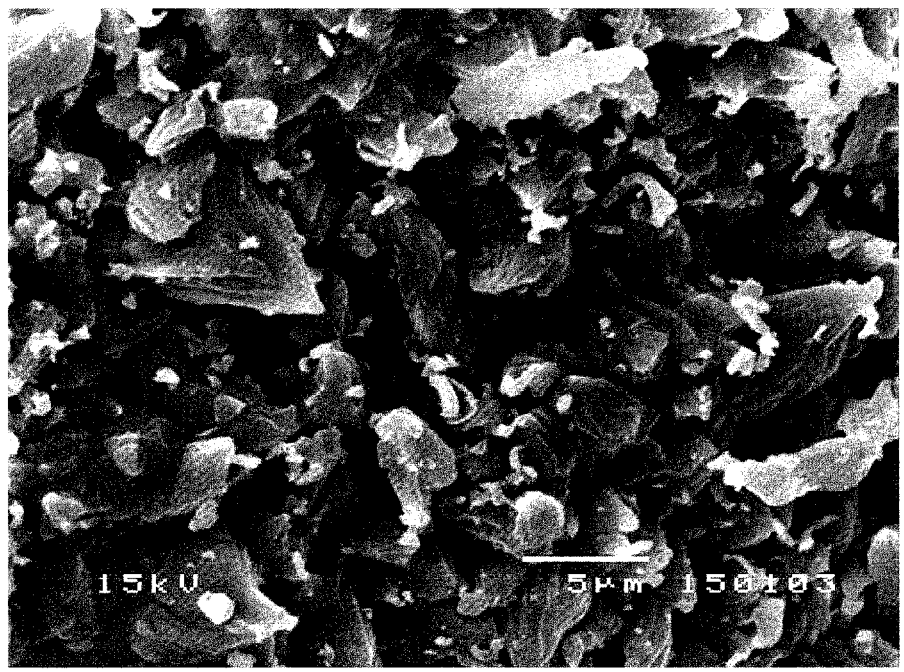
FIG. 8 is a scanning electron micrograph of the surface condition for the inorganic compound particles on the test number 4-05.

As shown in FIGS. 7 and 8, the inorganic compound particles produced by the above-mentioned method have a surface structure which covered in extremely small protrusions compared with the particle size in some cases. The protrusions are nano-size and cover the surface of the particles in a brushed shape.

It is expected that the specific surface area of the inorganic compound particles can be extremely enlarged by having this surface structure. Accordingly, the functional expression on the surface is easily expected.

According to the present invention, the particles of the inorganic compound having a multi-layered structure (bi-layer) can be produced. In this structure, the major constituent element of the central part is the element constituting the first raw particles. The major constituent element of the outer peripheral part (surface layer part) is the element constituting the second raw particles. In other words, the particles of the inorganic compound having a multi-layered structure with the central part and the outer peripheral part can be obtained. In the central part, the above-mentioned synthetic reaction does not occur. In the outer peripheral part, the synthesized material is formed (see FIGS. 10 to 12, which are explained later).

The particles with the multi-layered structure are extremely important to have the surface effect which be expressed the second raw particles. Thus, it is expected that the inorganic compound particles with such a layered structure well be utilized in many purposes.

In addition, particles with a uniform composition can be obtained by performing heat treatment again, since such a layered structure is an intermediate structure to be fully uniformed. Alternatively, the multi-layered particles can be directly used for a certain purpose. Therefore, the utility of the inorganic compound particles can be extended.

In the present invention, particles of an inorganic compound having a uniform composition from the outer peripheral to the center part can be produced (see FIGS. 13 and 14, which are explained later).

As explained above, in the present invention, particles of an inorganic compound having different internal structures can be produced depending on the conditions chosen during their production.

Figure 19:
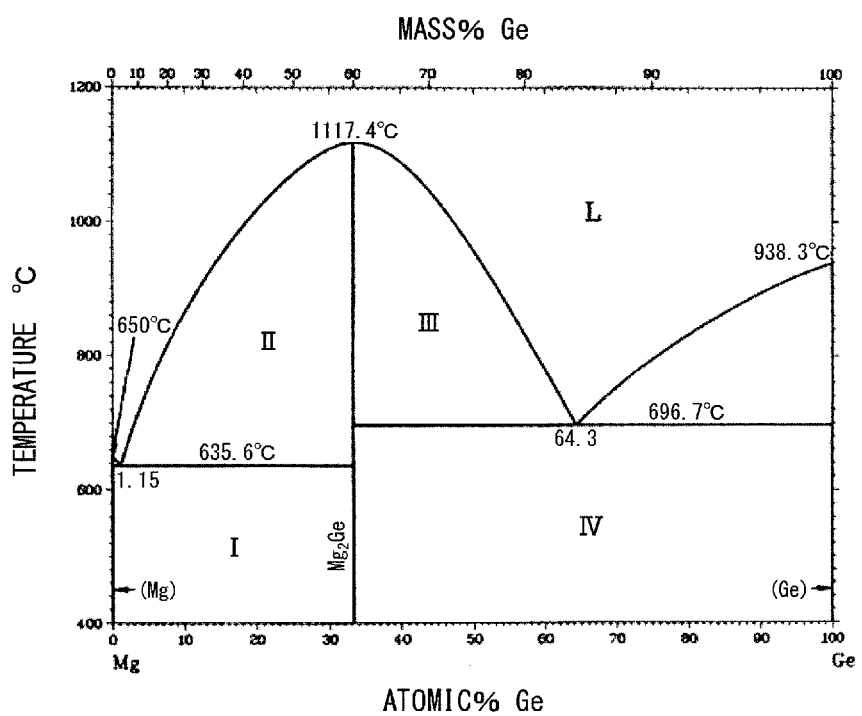
FIG. 19 is a phase equilibrium diagram of Mg—Ge.

FIG. 19 is a binary system equilibrium diagram of Mg—Ge which constitutes $Mg_2Ge$ as an example of the inorganic compound. In this phase diagram, the region-I corresponds to Mg (solid phase) and $Mg_2Ge$ (solid phase), the region-II corresponds to a liquid phase and $Mg_2Ge$ (solid phase), the region-III corresponds to a liquid phase and Ge (solid phase), and the region-IV corresponds to Ge (solid phase) and $Mg_2Ge$ (solid phase).

The heat treatment temperature is higher than the eutectic temperature between the region-II (liquid-solid phase range) and the region-I (solid phase range) in a phase diagram of the elements constituting the both raw particles, and lower than the H point.

Therefore, in order to produce the particles of the inorganic compound made of $Mg_2Ge$ from the first raw particles 1 (Ge) and the second raw particles 2 (Mg), the heat treatment temperature is set to 636° C., which is the eutectic temperature of the regions I and II, or higher and lower than 696° C., which is the H point.

The second raw particles (Mg) are melted by heated at the above-mentioned temperature range. On the other hand, the first raw particles 1 (Ge) are maintained at the solid-phase state. The melt liquid of the second raw particles 2 (Mg) is adsorbed into the first raw particles 1 (Ge). The particles of the inorganic compound ($Mg_2Ge$) can be obtained by synthetic reaction between Mg and Ge within the first raw particles 1.

The production method of the present invention has been made based on a finding that the first raw particles absorb the melt liquid of the other material and the inorganic compound particles can be obtained by the synthetic reaction within the particles. This method is an unconventional and novel chemical synthesis method.

Also, the core of raw particles (the first raw particles) can be turned into a composite kept in the particle-form. Thus, even if the particle diameter is several dozens of microns or larger, the inorganic compound particle can be obtained easily by low cost, that is, the crushing process is not necessary at all.

Also, variation of the composition of the particles, contamination of impurities, oxidation, or the like can be suppressed, since the first raw particles do not melt.

In addition, the particles of an inorganic compound, which is the second aspect of the present invention, can have a multi-layered structure in which only the outer peripheral part of the particle (outer surface part) is made of the synthesized material. Alternatively, the entire part of the particle can have a uniform composition. The structure for the inorganic compound particles can be easily regulated by the size of the second raw particles, the heat treatment temperature, the heating time, or the like.

The size of the inorganic compound particle can be determined by the amount of the material adsorbed into the first raw particles (the second raw particles). Thus, compound particles if a necessary particle size is set up beforehand, compound-particles with an desired size can be obtained with a high yield by determining the size of the first raw particles based on the synthetic condition.

Further, the specific surface area of the obtained compound particles is significantly increased since the surface of the compound particles are covered by nano-size protuberances in a raised fabric shape. Thus, particles which have an excellent surface effect can be provided. In addition, each particle can be conjugated easily jointing by the protuberances in a raised fabric shape, and increasing the mechanical strength of the sintered compact.

EXAMPLES

Example 1

The first raw particles (Si particles), which were made of Si (purity: 99.9999%), and the second raw particles (Mg granules), which were made of Mg (purity: 99.9%), were prepared.

The Si particles were classified by sieve after crushing Si ingot in an alumina mortar. The classified particles with having particle sizes of exceeding 150 μm and equals to or less than 250 μm, exceeding 106 μm and equals to or less than 150 μm, exceeding 75 μm and equals to or less than 106 μm, exceeding 53 μm and equals to or less than 75 μm exceeding 38 μm and equals to or less than 53 μm, exceeding 20 μm and equals to or less than 38 μm were prepared by using sieves whose openings were 500, 250, 150, 106, 75, 53, 38, 20 μm.

As the Mg granules, ones having the particle size of about 3 to 8 mm and ones having the particle size of about 1 to 3 mm were prepared.

The Mg granules and Si particles were weighted in order to have a mixing ratio of 2.02 to 1.00 (atomic ratio of Mg:Si).

As shown in FIG. 1, the Mg particles 2 were placed on all over the bottom surface of the heating container 10 (carbon board) evenly. Then, as shown in FIG. 2, the Si particles 1 were placed on the Mg particles 2 to cover the Mg particles 2. Then, the heating container 10 was placed in the heating furnace to perform heat treatment under the mixed gas atmosphere of 0.1 MPa argon-3% hydrogen. The heat treatment temperature was set to 700° C. or 870° C. The heat treatment time was set to 2 or 4 hours when the heat treatment temperature was 870° C. It was set to 10 hours when the heat treatment temperature was 700° C.

After the heat treatment, a visual inspection, a sieve classification, and a phase analysis by X-ray diffraction were performed. Also, shape and surface observation, and composition analysis were performed by a scanning electron microscope. Results are shown in Table 4.

Based on the visual inspection results, it was demonstrated that the produced materials were all in a granular form, not in a block form, when the particle sizes of the Si particles exceeded 150 μm and equaled to 250 μm or less, or it exceeded 106 μm and equaled to 150 μm or less.

However, the produced materials were in a block form with having particles being bonded together, when the heat treatment temperature was 870° C. and the particle size of the Si particles exceeded 38 μm and equaled to 53 μm or less, or it exceeded 20 μm and equaled to 38 μm or less.

Figure 3:
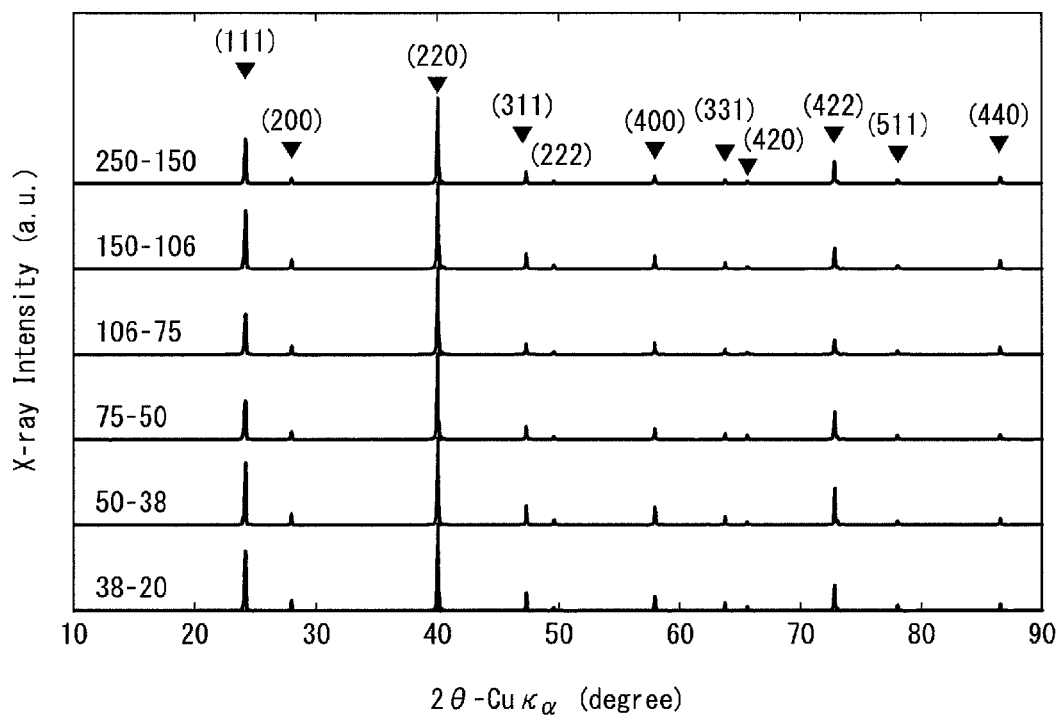
FIG. 3 is X-ray diffraction profiles for the inorganic compounds particles of the test numbers 3-03 to 3-08.

Results of the phase analysis for the produced materials by X-ray diffraction are shown in FIG. 3. Only obtained X-ray diffraction profile was an anti-fluorite structure, and the diffraction peaks originated from Mg or Si, or an unidentified diffraction peak was not observed. Therefore, it was confirmed that the produced materials were the single phase of $Mg_2Si$.

The Si particles before the heat treatment and the particles of a compound obtained by the heat treatment were observed by a scanning electron microscope.

Figure 4:
FIG. 4 is a scanning electron micrograph of the Si particles (whose particle sizes are from 106 μm to 150 μm) which are raw materials.

FIG. 4 shows Si particles whose particle diameters exceeds 106 μm and equals to 150 μm or less obtained after crushing in the above-mentioned mortar and the classification. There were many particles which are a flat form, a plate form, and a granular form.

Figure 5:
FIG. 5 is a scanning electron micrograph of the Si particles (whose particles sizes are from 53 μm to 75 μm) which are raw materials.

FIG. 5 shows Si particles whose particle sizes exceeds 53 μm and equals to 75 μm or less. Similarly, many particles were included with a flat form, a plate form, and a granular form.

Figure 6:
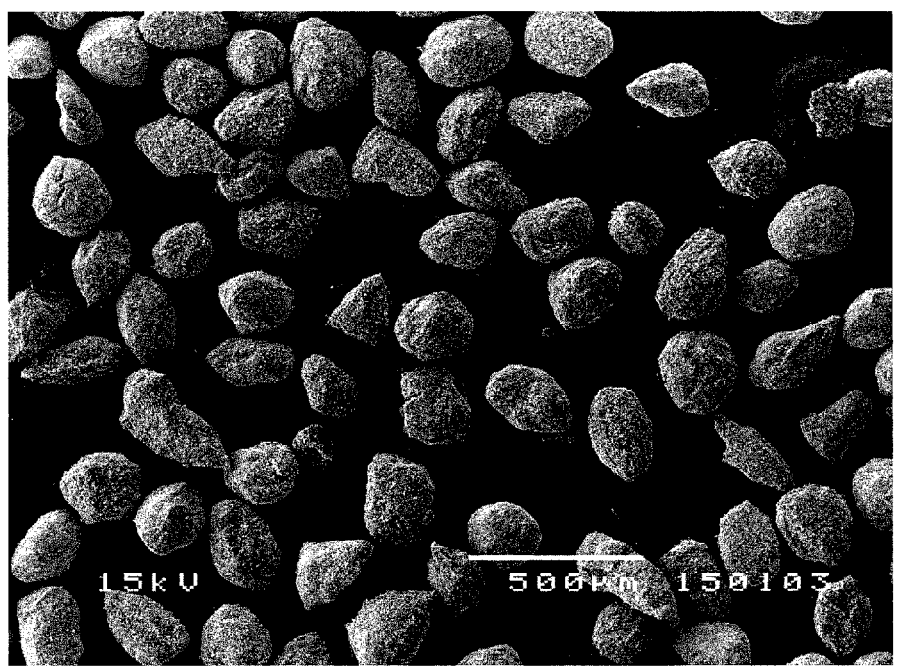
FIG. 6 is a scanning electron micrograph of the inorganic compound particles for the test number 4-05.

FIG. 6 shows the compound particles obtained by performing the heat treatment to the Si particles shown in FIG. 5 (particle diameter: exceeds 53 μm and equals to 75 μm or less). The o compound particles were in rounded shapes compared with before the heat treatment.

FIG. 7 is an enlarged photographic image of the compound particle (testing number 4-05, which is explained later). FIG. 8 shows the state for the surface of the compound particle. As shown in this figure, the surface of the compound particle was not smooth, and numbers of spiky micro protrusions were observed.

Figure 9:
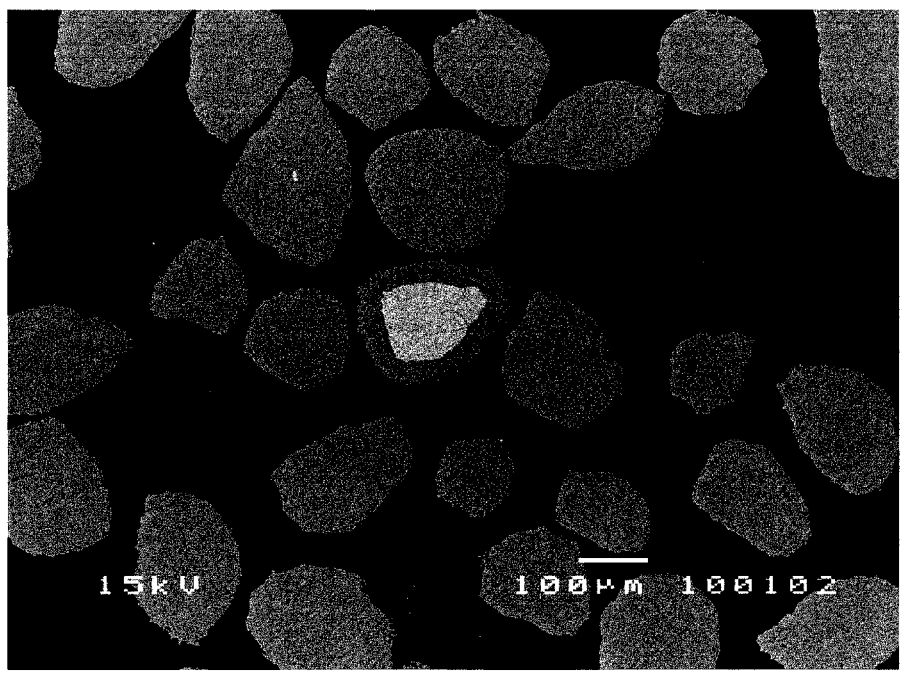
FIG. 9 is a composition image of a cross section for the inorganic compound particles on the test number 4-02.

FIG. 9 shows a composition image for a cross section of the inorganic compound particles (the test number 4-02, which is explained later) obtained by polishing the particles after embedding the compound particles, which were subjected to the heat treatment at 870° C. for 2 hours, in a resin.

In the composition image, particles of two kinds were observed, that are uniformly gray in their entire cross sections and a multilayer structure which the central part was white and the outer peripheral part was gray.

In the composition image, the difference of colors means the difference of the average molecular weight, indicating compositions were different. Thus, characteristic X-ray images of Si and Mg were obtained by an X-ray spectrometer using an energy dispersive X-ray spectrometer in order to investigate the uniformity of the compound particles.

Figure 10:
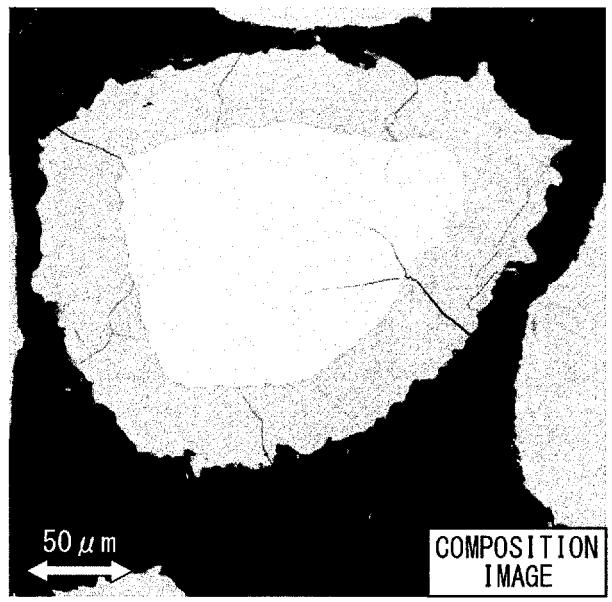
FIG. 10 is a composition image of a cross section for the inorganic compound particle on the test number 4-02. The particle in FIG. 10 is unreacted.
Figure 11:
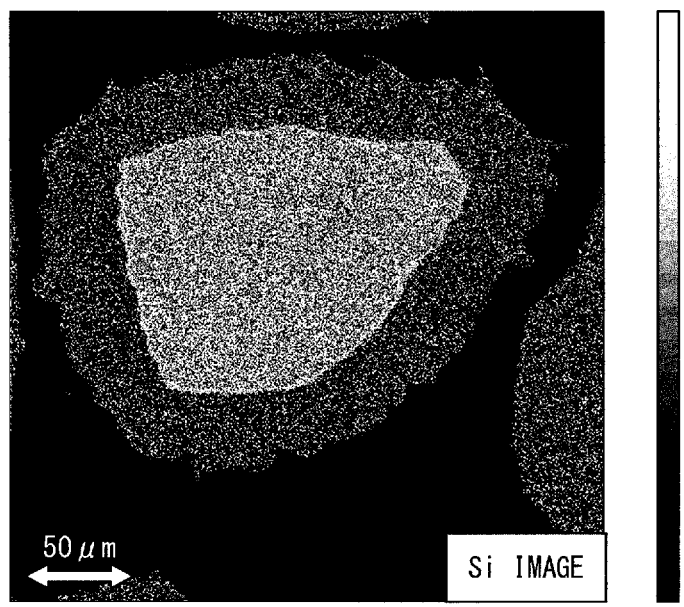
FIG. 11 is a Si concentration distribution image of a cross section for the inorganic compound particle on the test number 4-02. The particle in FIG. 11 is unreacted.
Figure 12:
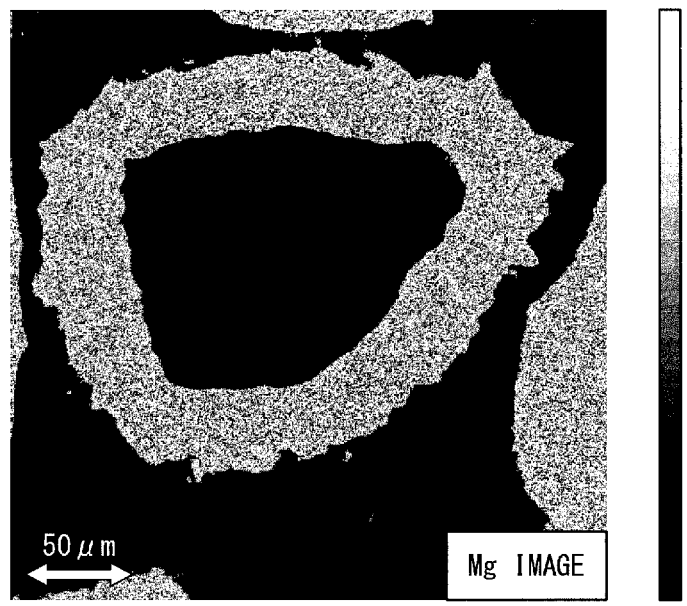
FIG. 12 is a Mg concentration distribution image of a cross section for the inorganic compound particle on the test number 4-02. The particle in FIG. 12 is unreacted.

FIG. 10 is a composition image of a cross section of the particles of an inorganic compound having the multi-layered structure. The central part was white, and the outer peripheral part was gray. FIG. 11 is a Si characteristic X-ray image of the particle. In this image, the high Si concentration is the white, the low concentration is the gray color. FIG. 12 is an Mg characteristic X-ray image.

By the Mg characteristic X-ray image, it was demonstrated that Mg exists in the outer peripheral part, and Mg hardly exists in the central part. Additionally, by the Si characteristic X-ray image, it was demonstrated that Si concentration was high in the central part and it was low in the outer peripheral part.

Based on these observations, it was demonstrated that the outer peripheral part was made of the composite ($Mg_2Si$) and the central part was made of Si alone. This indicates that the synthetic reaction did not proceed to the central part. Extent of this synthetic reaction can be stimulated to the central part by a longer heat treatment time.

Figure 13:
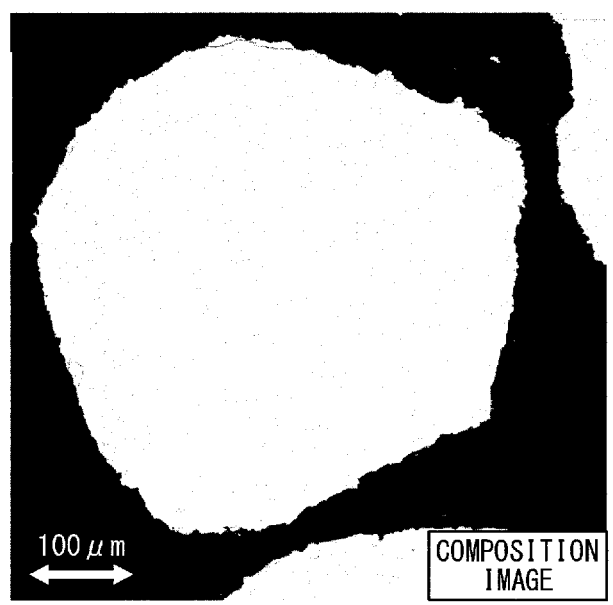
FIG. 13 is a composition image of a cross section of the particles of an inorganic compound of the test number 4-04. The particle in FIG. 13 have reacted completely.
Figure 14:
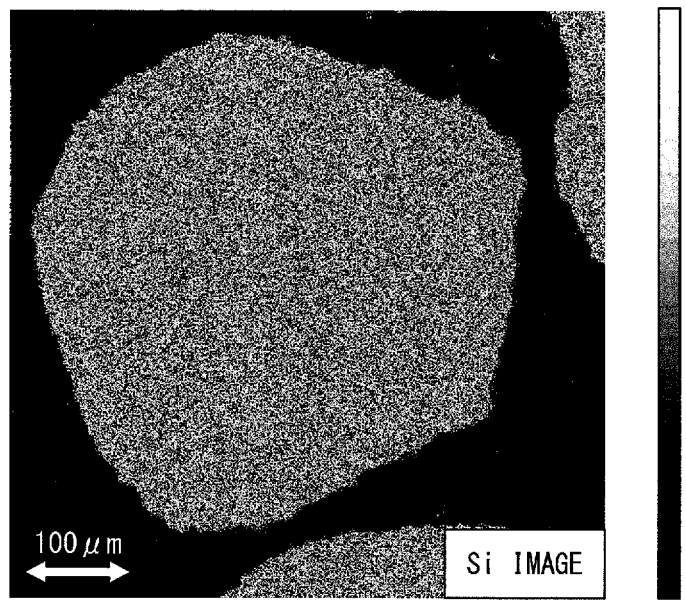
FIG. 14 is a Si concentration distribution image of a cross section for the inorganic compound particles of the test number 4-04.
Figure 15:
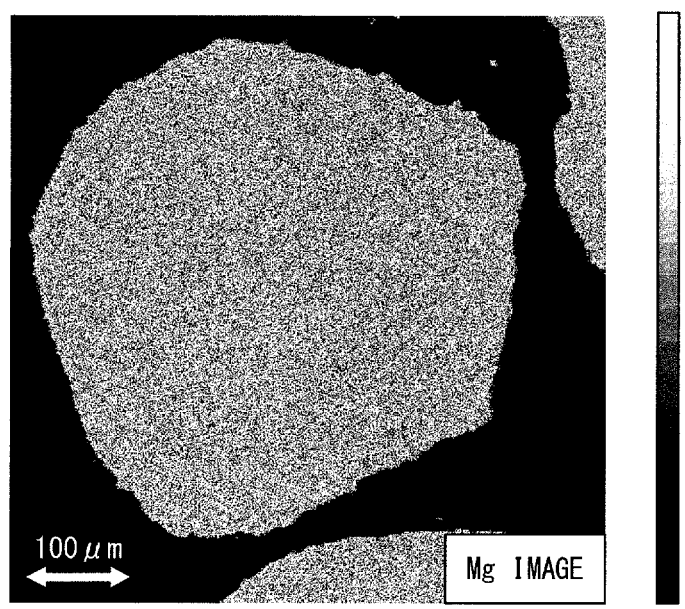
FIG. 15 is a Mg concentration distribution image of a cross section for the inorganic compound particles of the test number 4-04.

FIG. 13 is a composition image of a particle, a cross-section of which was uniformly gray in the entire cross sections. FIG. 14 is an Mg characteristic X-ray image. FIG. 15 is a Si characteristic X-ray image. For both the characteristic X-ray images of Mg and Si, the cross-sections had a uniform color in the entire cross-sections. Therefore, it was demonstrated that these particles had a uniform composition in the entire cross-sections.

The yields for each particle were measured after classifying sieve the produced single phase under each heat treatment conditions. The yields are shown as percentage (mass percentage).

Figure 16:
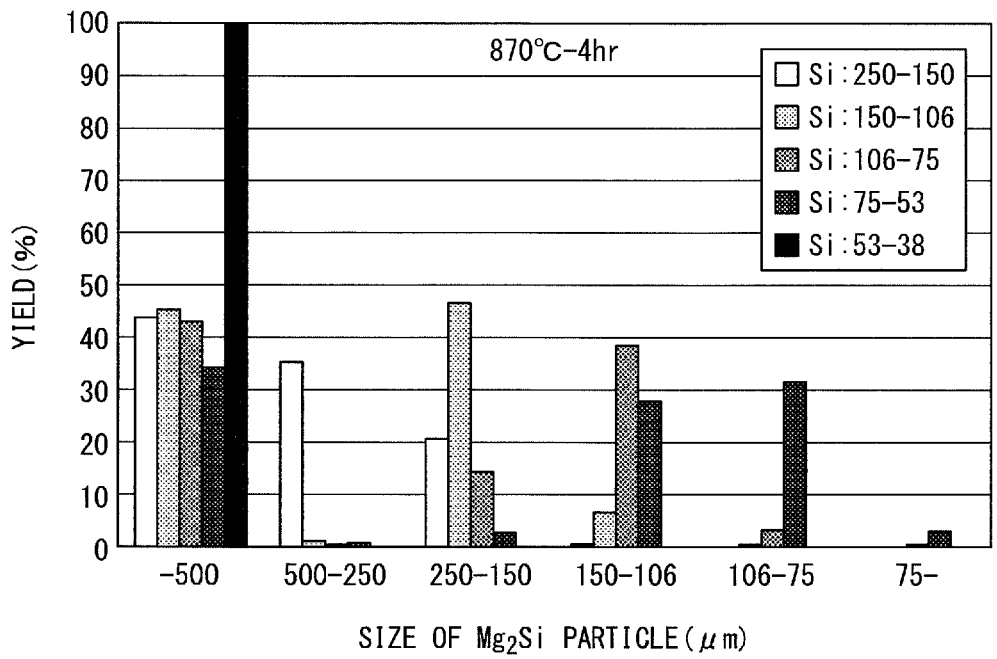
FIG. 16 is a graph showing yields for inorganic compound particles of the testing numbers 4-03 to 4-08.

FIG. 16 shows yields of compound particles when the heat treatment was performed at 870° C. for 4 hours using Mg particles having the particle size of about 3 to 8 mm.

When the particle size of the Si particles were 106 µm or less at least part of the compound (product) became a large block form. The yield of block form was 43.0% when the size of the Si particles was more than 75 µm and 106 µm or less. The yield of block form was 34.0% when it was more than 53 µm and 75 µm or less. The yield of block form was 100% when it was 53 µm or less.

Based on these results, it was demonstrated that compounds of a particle shape cannot be obtained when the particle size of Si particles was 53 µm or less.

As shown in FIG. 16, the yield of the compound particles having the particle size of 500 µm or more by using the particle sizes of Si particles were 106 µm or more, in a case were 43.7% where the particle sizes of Si particles were more than 150 µm and 250 µm or less, and in a case were 45.2% where it was more than 106 µm and 150 µm or less.

When using the Si particles having particle sizes of more than 150 µm and 250 µm or less, the yields of the compound particles were 35.3% in a case where the particle size of the Si particles was more than 250 µm and 500 µm or less, in a case were 20.6% where it was more than 150 µm and 250 µm or less, in a case were 0.4% where it was more than 106 µm or 150 µm or less, 0.06% in a case where it was more than 75 µm and 106 µm or less, and in a case were 0.02% where it was 75 µm or less.

When using the Si particles having particle sizes of more than 106 µm and 150 µm or less, the yields of the compound particles were 1.2% in a case where the particle size of the Si particles was more than 250 µm and 500 µm or less, in a case were 46.7% where it was more than 150 µm and 250 µm or less, in a case were 6.6% where it was more than 106 µm and 150 µm or less, in a case were 0.3% where it was more than 75 µm and 106 µm or less, and in a case were 0.05% where it was 75 µm or less.

When using the Si particles having particle sizes of more than 75 µm and 106 µm or less, the yields of the compound particles were 0.6% in a case where the particle size of the Si particle was more than 250 µm and 500 µm or less, in a case were 14.5% where it was more than 150 µm and 250 µm or less, in a case were 38.4% where it was more than 106 µm and 150 µm or less, in a case were 3.3% where it was more than 75 µm and 106 µm or less, and in a case were 0.3% where it was 75 µm or less.

When using the Si particles having particle sizes of more than 53 µm and 75 µm or less, the yields of the compound particles were 0.7% in a case where the particle size of the Si particle was more than 250 µm and 500 µm or less, in a case were 2.8% where it was more than 150 µm and 250 µm or less, in a case were 27.8% where it was more than 106 µm and 150 µm or less, in a case were 31.7% where it was more than 75 µm and 106 µm or less, and in a case were 3.0% where it was 75 µm or less.

Based on these results, it was demonstrated that a large number of the single-phase compound particles with a larger particle size than that of the used Si particles were obtained. Also, a small number of the compound particles with a smaller size than the used Si particles were obtained.

It was also demonstrated that 80% or more of the whole compound particles was occupied by the compound particles with the larger particle size than that of the used Si particles and the block object. And it accounted that the compound particles of the other particle size was very few.

Figure 17:
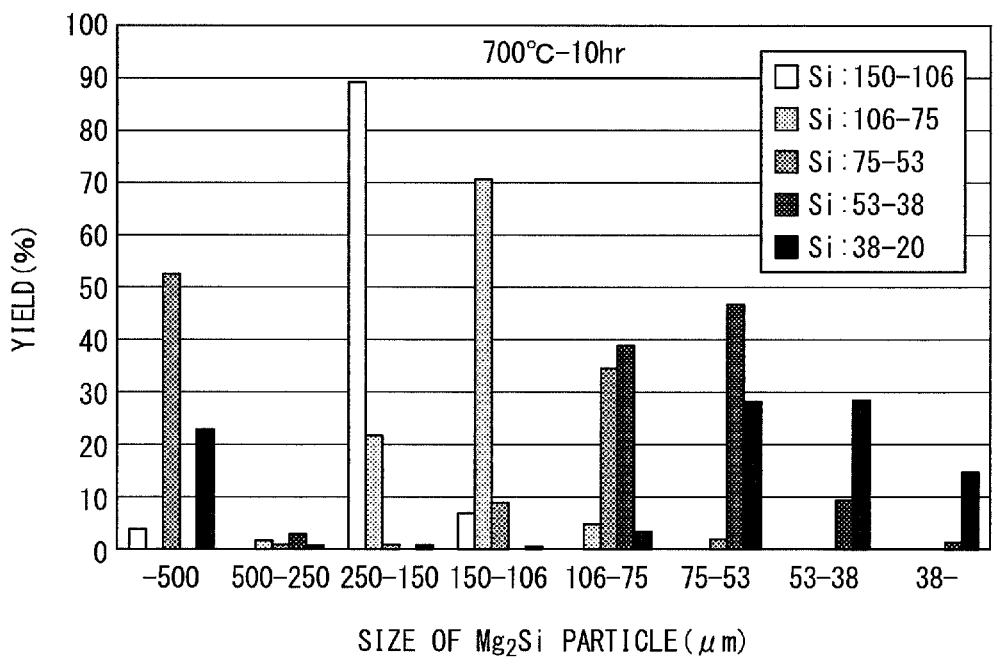
FIG. 17 is a graph showing yields for inorganic compound particles of the testing numbers 4-14 to 4-18.
Figure 21:
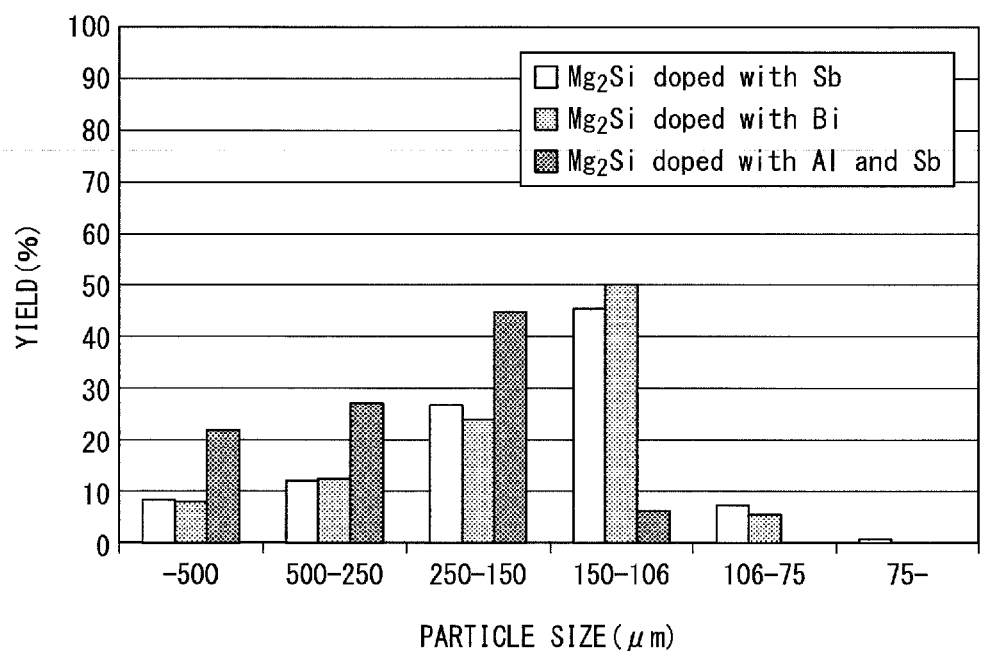
FIG. 21 is a graph showing yield of $Mg_2Si$ particles in the testing numbers 5-01 to 5-03. Sb, Bi, or Al is doped in $Mg_2Si$ as a dopant element.

In FIGS. 16, 17 and 21, the block object was indicated as "–500." Similarly, the size more than 250 µm and 500 µm or less, the size more than 150 µm and 250 µm or less, the size more than 106 µm and 250 µm or less, the size more than 75 µm and 106 µm or less, and the size more than 53 µm and 75 µm or less, were indicated as "500-250", "250-150", "150-106", "106-75", and "75-53", respectively. Similarly, the size equals to 75 µm or less, the size more than 38 µm and 75 µm or less, and the size equals to 38 µm or less, were indicated as "75-", "53-38", and "38-."

When the heat treatment was performed at 870° C. for 4 hours using Mg particles having the particle size of about 1 to 3 mm, the yield of the single-phase compound particle increased compared with a case in Mg particles having the size of about 3 to 8 mm.

When using the Si particles having particle sizes of more than 150 µm and 250 µm or less, the block object which sintered together each particle accounted for 12.6%. The yields of the $Mg_2Si$ compound particles were 59.9% in a case where the particle size of the Si particle was more than 250 µm and 500 µm or less, in a case were 26.9% where it was more than 150 µm and 250 µm or less, in a case were 0.5% where it was more than 106 µm and 150 µm or less, in a case were 0.03% where it was more than 75 µm and 106 µm or less, and in a case were 0.04% where it was 75 µm or less.

When using the Si particles having particle sizes of more than 106 µm and 150 µm or less, the block object which sintered together each particle was occupied at 8.4%. The yields of the $Mg_2Si$ compound particles were 3.3% in a case where the particle size of the Si particle was more than 250 µm and 500 µm or less, in a case were 74.0% where it was more than 150 µm and 250 µm or less, in a case were 13.7% where it was more than 106 µm and 150 µm or less, in a case were 0.5% where it was more than 75 µm and 106 µm or less, and in a case were 0.08% where it was 75 µm or less.

Based on these results, it was demonstrated that the particle size of the Mg particles affected the yield drastically. A higher yield was obtained when the particle size was about 1 to 3 mm compared with the about 3 to 8 mm.

FIG. 17 shows yields of compound particles when the heat treatment was performed at 700° C. for 10 hours using Mg particles having the particle size of about 1 to 3 mm.

The yields of the block object were 3.5% in a case where the particle size of the Si particle was more than 106 µm and 150 µm or less, in a case were 0% where it was more than 75 µm and 106 µm or less, in a case were 56.6% where it was more than 53 µm and 75 µm or less, in a case were 0% where it was more than 38 μm and 53 μm or less, and in a case were 23.1% where it was more than 20 μm and 38 μm or less.

Based on these results, it was demonstrated that only particles were obtained and the block object was not produced, if the particle size of the Mg particles have been set to about 1 to 3 mm and the heat treatment temperature have been set at a low level.

Depending on the particle size of the Si particles, the block object still could have been formed. However, the compounds in a granular form were obtained even if the particle size of the Si particles were more than 20 μm and 38 μm or less in the present test condition (the heat treatment temperature: 700° C.), compared to the case which the compound became the block form altogether where the particle size of the Si particles was less than 53 μm at the heat treatment temperature of 870° C.

When using the Si particles having particle sizes of more than 106 μm and 150 μm or less, the yields of the compound particles were 0% in a case where the particle size of the Si particles was more than 250 μm and 500 μm or less, in a case were 89.4% where it was more than 150 μm and 250 μm or less, in a case were 7.1% where it was more than 106 μm and 150 μm or less, in a case were 0.05% where it was more than 75 μm and 106 μm or less, and in a case were 0.04% where it was 75 μm or less.

When using the Si particles having particle sizes of more than 75 μm and 106 μm or less, the yields of the compound particles were 1.9% in a case where the particle size of the Si particle was more than 250 μm and 500 μm or less, in a case were 21.9% where it was more than 150 μm and 250 μm or less, in a case were 70.9% where it was more than 106 μm and 150 μm or less, in a case were 5.1% where it was more than 75 μm and 106 μm or less, and in a case were 0.3% where it was 75 μm or less.

When using the Si particles having particle sizes of more than 53 μm and 75 μm or less, the yields of the compound particles were 0.7% in a case where the particle size of the Si particle was more than 250 μm and 500 μm or less, in a case were 0.8% where it was more than 150 μm and 250 μm or less, in a case were 16.2% where it was more than 106 μm and 150 μm or less, in a case were 24.3% where it was more than 75 μm and 106 μm or less, and in a case were 2.3% where it was 75 μm or less.

When using the Si particles having particle sizes of more than 38 μm and 53 μm or less, the yields of the compound particles were 3.0% in a case where the particle size of the Si particle was more than 250 μm and 500 μm or less, in a case were 0.3% where it was more than 150 μm and 250 μm or less, in a case were 0.2% where it was more than 06 μm and 150 μm or less, in a case were 38.9% where it was more than 75 μm and 106 μm or less, in a case were 46.7% where it was more than 53 μm and 75 μm or less, in a case were 9.4% where it was more than 38 μm and 53 μm or less, and in a case were 1.6% where it was more less than 38 μm.

When using the Si particles having particle sizes of more than 20 μm and 38 μm or less, the yields of the compound particles were 0.9% in a case where the particle size of the Si particle was more than 250 μm and 500 μm or less, in a case were 0.7% where it was more than 150 μm and 250 μm or less, in a case were 0.4% where it was more than 106 μm and 150 μm or less, in a case were 3.7% where it was more than 75 μm and 106 μm or less, in a case were 28.5% where it was more than 53 μm and 75 μm or less, in a case were 28.5% where it was more than 38 μm and 53 μm or less, and in a case were 14.5% where it was more less than 38 μm.

As shown above, the yield of the compound particles was drastically increased when they were synthesized in a condition where the temperature of the heat treatment was 700° C. for 10 hours and Mg particles having the particle size of about 1 to 3 mm were used. The maximum yield was 89.4%.

Based on these results, it was demonstrated that the compound particles could be produced efficiently in a temperature between the eutectic temperature, 637.6° C., of the region-I and the region-II and the eutectic temperature, 950° C., of the region-III and the region-IV in the Mg—Si phase diagram shown in FIG. 18. Also, it was demonstrated that the yield of the compound particles was high if the temperature have been in the neighborhood of 650° C., which is the melting point of Mg, and the particle size of the Mg particles have been around 3 mm (i.e., 1 to 3 mm).

TABLE 4

| No. | Raw particle | | | | Heating treatment | | Inorganic compound | | | | | | | |
|---|---|---|---|---|---|---|---|---|---|---|---|---|---|---|
| | First | | Second | | Temp. | Time | Shape | Composition | Yield (wt %) | | | | | |
| | | Size | | Size | ° C. | hr | A* | B* | 51* | 50* | 25* | 15* | 10* | 7* |
| 4-01 | Si | 250* | Mg | 6* | 870 | 2 | ○ | Mg$_2$Si + Si | 7.7 | 50.3 | 41.3 | 0.6 | 0.06 | 0.1 |
| 4-02 | Si | 150* | Mg | 6* | 870 | 2 | ○ | Mg$_2$Si + Si | 7.2 | 9.1 | 76.4 | 7 | 0.06 | 0.25 |
| 4-03 | Si | 250* | Mg | 6* | 870 | 4 | ○ | Mg$_2$Si | 43.7 | 35.3 | 20.6 | 0.4 | 0.06 | 0.02 |
| 4-04 | Si | 150* | Mg | 6* | 870 | 4 | ○ | Mg$_2$Si | 45.2 | 1.2 | 46.7 | 6.6 | 0.3 | 0.05 |
| 4-05 | Si | 106* | Mg | 6* | 870 | 4 | ○ | Mg$_2$Si | 43 | 0.6 | 14.5 | 38.4 | 3.3 | 0.3 |
| 4-06 | Si | 75* | Mg | 6* | 870 | 4 | ○ | Mg$_2$Si | 34 | 0.7 | 2.8 | 27.8 | 31.7 | 3 |
| 4-07 | Si | 53* | Mg | 6* | 870 | 4 | Unclear | Mg$_2$Si | 100 | 0 | 0 | 0 | 0 | 0 |
| 4-08 | Si | 38* | Mg | 6* | 870 | 4 | Unclear | Mg$_2$Si | 100 | 0 | 0 | 0 | 0 | 0 |
| 4-09 | Si | 150* | Mg | 6* | 700 | 10 | ○ | Mg$_2$Si | 3.48 | 0 | 89.4 | 7.1 | 0.05 | 0.04 |
| 4-10 | Si | 106* | Mg | 6* | 700 | 10 | ○ | Mg$_2$Si | 0.9 | 32.7 | 24.7 | 39 | 2.4 | 0.2 |
| 4-11 | Si | 250* | Mg | 3* | 870 | 4 | ○ | Mg$_2$Si | 12.6 | 59.9 | 26.9 | 0.5 | 0.03 | 0.04 |
| 4-12 | Si | 150* | Mg | 3* | 870 | 4 | ○ | Mg$_2$Si | 8.4 | 3.3 | 74 | 13.7 | 0.52 | 0.08 |
| 4-13 | Si | 38* | Mg | 3* | 870 | 4 | Unclear | Mg$_2$Si | 100 | 0 | 0 | 0 | 0 | 0 |
| 4-14 | Si | 150* | Mg | 3* | 700 | 10 | ○ | Mg$_2$Si | 3.5 | 0 | 89.4 | 7.1 | 0.05 | 0.04 |
| 4-15 | Si | 106* | Mg | 3* | 700 | 10 | ○ | Mg$_2$Si | 0 | 1.9 | 21.9 | 70.9 | 5.1 | 0.25 |
| 4-16 | Si | 75* | Mg | 3* | 700 | 10 | ○ | Mg$_2$Si | 56.6 | 0.7 | 0.8 | 16.2 | 24.3 | 2.3 |
| 4-17 | Si | 53* | Mg | 3* | 700 | 10 | ○ | Mg$_2$Si | 0 | 3 | 0.25 | 0.16 | 38.9 | 57.7 |
| 4-18 | Si | 38* | Mg | 3* | 700 | 10 | ○ | Mg$_2$Si | 23.1 | 0.89 | 0.72 | 0.38 | 3.7 | 71.26 |

TABLE 4-continued

| | Raw particle | | | Heating treatment | | | Inorganic compound | | | | | | |
|---|---|---|---|---|---|---|---|---|---|---|---|---|---|
| | First | | Second | | Temp. | Time | Shape | Composition | Yield (wt %) | | | | |
| No. | Size | | Size | | °C. | hr | A* | B* | 51* | 50* | 25* | 15* | 10* | 7* |
| 4-19 | Si | 1* | Mg | 3* | 700 | 10 | Unclear | Mg$_2$Si | 100 | 0 | 0 | 0 | 0 | 0 |
| 4-20 | Si | 1000* | Mg | 6* | 900 | 10 | ○ | Mg$_2$Si + Si | 100 | 0 | 0 | 0 | 0 | 0 |

6*: Particle size is 3-8 mm.
3*: Particle size is 1-3 mm.
μm*: Lower limit indicates "more than" and upper limit indicates "equals to or less."
53*: Particle size is 38-53(μm*).
38*: Particle size is 20-38(μm*).
20*: Particle size is 20 μm or less.
1*: Particle size is 1 μm or less.
A*: Presence or absence of a surface having the raised fabric shape: ○; present,
51*: Block form in which particles are sintered together.
50*: Particle size is 250-500(μm*).
1000*: Particle size is 0.5-1 mm.
250*: Particle size is 150-250(μm*).
150*: Particle size is 106-150(μm*).
106*: Particle size is 75-106(μm*).
x; absent.
B*: Composition and uniformity of the compound particles. Only one composition is indicated. When the particle is uniform, only one composition is indicated. When the particle has a layered-structure, two compositions are shown. One in the left shows the composition of the outer peripheral layer. One in the right shows the composition of the central part.
25*: Particle size is 150-250(μm*).
15*: Particle size is 106-150(μm*).
10*: Particle size is 75-106(μm*).
7*: Particle size is 75 μm or less.

Figure 20:
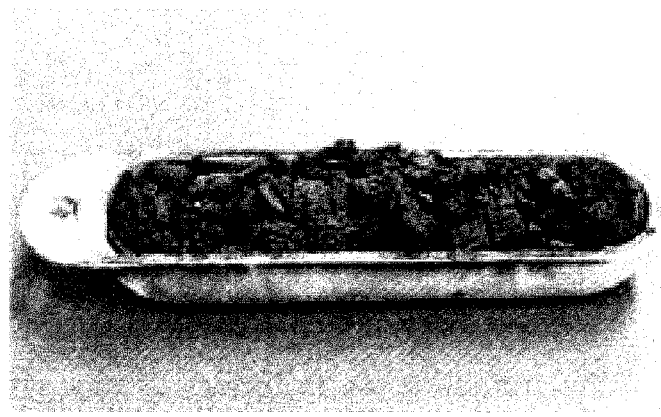
FIG. 20 is a photographic showing a state for the inorganic compound particles of the testing number 4-19 after heat treatment.

FIG. 20 is a photographic image of the compound obtained in the testing number 4-19. In this test, compounds in a block form were obtained, instead of compounds in a granular form.

Example 2

The first raw particles (Si particles), which were made of Si (purity: 99.9999%), and the second raw particles (Mg granules), which were made of Mg (purity: 99.9%), were prepared.

The classified Si particles by using sieve, which had particle sizes of more than 106 μm and 150 μm or less and particle sizes of more than 75 μm and 106 μm or less, were prepared.

The Mg particles having the particle size of about 1 to 3 mm were prepared.

As the additional elements, antimony (Sb) powder having the particle size of more than 75 μm and 250 μm or less (purity: 99.99%), bismuth (Bi) particles having the particle size of about 1 to 3 mm (purity: 99.999%), and aluminum (Al) particles having the particle size of more than 75 μm and 150 μm or less (purity: 99.9%), were prepared.

These above-mentioned particles were weighed to obtain inorganic compound having compositions of Mg$_{2.02}$Si$_{0.99}$Sb$_{0.01}$, Mg$_{2.02}$Si$_{0.99}$Bi$_{0.01}$, Mg$_{2.01}$Al0.01Si0.99Sb0.01.

As shown in FIG. 1, the Mg particles 2 were placed on all over the bottom surface of the heating container 10 (carbon board) evenly. Then, as shown in FIG. 2, the Si particles and other additional elements (Si, Sb, Bi, and Al) 1 were placed on the Mg particles 2 to cover the Mg particles 2. Then, the heating container 10 was placed in the heating furnace to perform heat treatment under the mixed gas atmosphere of 0.1 MPa argon-3% hydrogen. The heat treatment temperature was set to 800° C. The heat treatment time was set to 4 hours.

A visual inspection, a sieve classification, and a phase analysis by X-ray diffraction were performed. Also, shape and surface observation, and composition analysis were performed by a scanning electron microscope. Results are shown in Table 5.

FIG. 21 is a graph showing the yields of the compound particles.

As shown in FIG. 21, for the testing number 5-01, the compound particle made of Mg$_2$Si with the doped Sb (composition formula: Mg$_2$Si$_{0.99}$Sb$_{0.01}$) was obtained, and the yields of the compound particles were 12.2% in a case where the particle size was more than 250 μm and 500 μm or less, in a case were 26.7% where it was more than 150 μm and 250 μm or less, in a case were 45.2% where it was more than 106 μm and 150 μm or less, in a case were 7.1% where it was more than 75 μm and 106 μm or less, and in a case were 0.5% where it was 75 μm or less.

For the testing number 5-02, the compound particle made of Mg$_2$Si with the doped Bi (composition formula: Mg$_2$Si$_{0.99}$Bi$_{0.01}$) was obtained, and the yields of the compound particles were 12.5% in a case where the particle size was more than 250 μm and 500μ or less, in a case were 23.9% where it was more than 150 μm and 250 μm or less, in a case were 50.1% where it was more than 106 μm and 150 μm or less, in a case were 5.4% where it was more than 75 μm and 106 μm or less, and in a case were 0.4% where it was 75 μm or less.

In the case where Sb was doped (testing number 5-01) and in the case where Bi was doped (testing number 5-02), the yields of the compound particles were at almost the same level, since the particle sizes of the Si particles (more than 75 μm and 106 μm or less) were the same and the heat treatment conditions were the same.

In the testing number 5-03, in which the compound particle made of Mg$_2$Si with the doped Sb and Al (composition formula: Mg$_{1.99}$Al$_{0.01}$Si$_{0.99}$Bi$_{0.01}$) was obtained, and the block object, in which the compound particles were adhered together, accounted for 21.8%. The yields of the compound particles were 26.8% in a case where the particle size was more than 250 μm and 500 μm or less, in a case were 44.8% where it was more than 50 μm and 250 μm or less, in a case were 6.1% where it was more than 106 μm and 50 μm or less, in a case were 0.3% where it was more than 75 μm and 106 μm or less, and in a case were 0.2% where it was 75 μm or less.

The particle size of the Si particles in the testing number 5-03 was larger compared with the testing numbers 5-01 and 5-02 (more than 106 μm and 150 μm or less). Therefore, the highest yield of the compound particles was obtained in the particle size of more than 150 μm and 250 μm or less.

Based on the results, it was demonstrated that the compound particles could be obtained easily if the third element (dopant element) was doped in addition to Mg and Si.

TABLE 5

| | Raw particle | | | Heat treatment | | Inorganic compound | | | | | | |
|---|---|---|---|---|---|---|---|---|---|---|---|---|
| | First | Second | | Temp. | Time | Composition | Yield (wt %) | | | | | |
| No. | Size | Size | Supplemented element | °C. | hr | B* | 51* | 50* | 25* | 15* | 10* | 7* |
| 5-01 | Si 106* | Mg 3* | Sb | 800 | 4 | $Mg_2Si_{0.99}Sb_{0.01}$ | 8.3 | 12.2 | 26.7 | 45.2 | 7.1 | 0.5 |
| 5-01 | Si 106* | Mg 3* | Bi | 800 | 4 | $Mg_2Si_{0.99}Bi_{0.01}$ | 7.8 | 12.5 | 23.9 | 50.1 | 5.4 | 0.4 |
| 5-03 | Si 150* | Mg 3* | Sb   Al | 800 | 4 | $Mg_{1.99}Al_{0.01}Si_{0.99}Bi_{0.01}$ | 21.8 | 26.8 | 44.8 | 6.1 | 0.3 | 0.2 |

3*: Particle size is 1-3 mm
μm*: Lower limit indicates "more than" and upper limit indicates "equals to or less" in μm.
150*: Particle size is 106-150(μm*).
106*: Particle size is 75-106(μm*).
51*: Block form.
50*: Particle size is 250-500(μm*).
25*: Particle size is 150-250(μm*).
15*: Particle size is 106-150(μm*).
10*: Particle size is 75-106(μm*).
7*: Particle size is 75 μm or less.

INDUSTRIAL APPLICABILITY

The particles of the inorganic compound obtained by the present invention can be utilized for a dispersion agent to improve mechanical strength of Mg alloy materials, which are light-weight construction materials. Also, sintered compacts of the particles can be used as a thermoelectric material.

BRIEF DESCRIPTION OF THE REFERENCE SYMBOLS

1: Si particle (first raw material particle)
2: Mg particle (second raw particle)

The invention claimed is:

1. A method of producing inorganic compound particles of a composite including Mg and Si, the method comprising the steps of:
   impregnating a melt liquid of second raw particles into first raw particles by heating a raw material including the first raw particles, at least some of which contain Si as a major constituent element, and the second raw particles, which contain Mg as a major constituent element, at a temperature, which equals to or higher than an eutectic temperature between a region-II (solid-liquid phase range) and a region -I (solid phase range) in a phase diagram of Mg and Si, and lower than the melting temperature of the inorganic compound; and
   synthesizing the inorganic compound particles by a reaction in the first raw particles between the element contained in the first raw particles and the element contained in the second raw particles wherein
   heating in the step of impregnating is performed at a temperature of 650° C. or higher and lower than 945.6 ° C,
   particle sizes of the first raw particles are more than 20 μm and equal to or less than 500 μm, and
   particle sizes of the inorganic compound particles are more than 25 μm and equal to 1 mm or less after the step of synthesizing the inorganic compound particles.

2. The method of making inorganic compound particles according to claim 1,
   wherein the first raw particles and the second raw particles are mixed in the raw material by an atomic ratio corresponding to the ratio of Si and Mg in the intended inorganic compound.

3. The method of producing inorganic compound particles according to claim 2,
   wherein the first raw particles are mixtures including particles which consist of Si and particles which consist of elements other than Si.

4. The method of producing inorganic compound particles according to claim 2,
   wherein the first raw particles are composite particles which consist of Si and elements other than Si.

5. The method of producing inorganic compound particles according to claim 1,
   wherein the first raw particles are mixtures including particles which consist of Si and particles which consist of elements other than Si.

6. The method of producing inorganic compound particles according to claim 1,
   wherein the first raw particles are composite particles which consist of Si and elements other than Si.

* * * * *